(12) United States Patent
Martini et al.

(10) Patent No.: US 8,013,305 B2
(45) Date of Patent: Sep. 6, 2011

(54) INFRARED WAVELENGTH IMAGING APPLICATIONS BASED ON QUANTUM WELL DEVICES

(75) Inventors: Rainer Martini, Hoboken, NJ (US); Patrick E. White, Bernardsville, NJ (US); Igor Alexandrov, New York, NY (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 676 days.

(21) Appl. No.: 11/667,986

(22) PCT Filed: Nov. 22, 2005

(86) PCT No.: PCT/US2005/042443
§ 371 (c)(1), (2), (4) Date: Jun. 9, 2008

(87) PCT Pub. No.: WO2006/058069
PCT Pub. Date: Jun. 1, 2006

(65) Prior Publication Data
US 2008/0258062 A1    Oct. 23, 2008

Related U.S. Application Data

(60) Provisional application No. 60/630,004, filed on Nov. 22, 2004.

(51) Int. Cl.
*H01L 31/00* (2006.01)
(52) U.S. Cl. ...................................... 250/353
(58) Field of Classification Search ............... 250/338.1, 250/353, 330
See application file for complete search history.

(56) References Cited

U.S. PATENT DOCUMENTS

| | | | |
|---|---|---|---|
| 6,028,323 A | 2/2000 | Liu | |
| 6,642,537 B1 | 11/2003 | Gunapala et al. | |
| 6,750,072 B2 * | 6/2004 | Buchanan et al. | 438/24 |
| 7,149,033 B2 * | 12/2006 | Buchsbaum | 359/618 |
| 2002/0030163 A1 | 3/2002 | Zhang | |
| 2003/0230715 A1 * | 12/2003 | Remillard et al. | 250/330 |
| 2004/0155186 A1 * | 8/2004 | Nestorovic et al. | 250/330 |
| 2005/0189492 A1 * | 9/2005 | Milton | 250/339.02 |
| 2006/0092520 A1 * | 5/2006 | Buchsbaum | 359/629 |

OTHER PUBLICATIONS

Written Opinion and International Search Report mailed on Apr. 21, 2008 in connection with PCT/US05/042443.

(Continued)

*Primary Examiner* — David Porta
*Assistant Examiner* — Djura Malevic
(74) *Attorney, Agent, or Firm* — Greenberg Traurig, LLP (57) ABSTRACT

An apparatus for detecting images in a first selected bandwidth includes a probe light source to generate a probe beam in a second selected bandwidth, an optical path including input imaging optics to capture an image in the first selected bandwidth and form an image beam and a beam combiner to optically combine the probe beam with the image beam to form a combined beam, and an optical readout quantum well device in the optical path of the combined beam, which simultaneously passes in an optical readout beam an intensity level of at least one wavelength within the probe beam in the second selected bandwidth in proportion to an intensity level of at least one wavelength within the image beam in the first selected bandwidth; and a detector sensitive to light in the second selected bandwidth and not sensitive to light in the first selected bandwidth.

44 Claims, 8 Drawing Sheets

OTHER PUBLICATIONS

A. Neogi, et al., "Ultrafast all-optical modulation of interband-light pulses by ultrashort intersubband light pulses in semiconductor quantum wells" (Journal of Applied Physics, Applied Physics Review, Mar. 15, 1999, vol. 85, No. 6, pp. 3352-3358, American Institute of.

T. Asano, et al., "Pump-probe measurement of ultrafast all-optical modulation based on intersubband transition in n-doped quantum wells" (Applied Physics Letters, Jul. 3, 2000, vol. 77, No. 1, pp. 19-21, American Institute of Physics).

A. Rogalski, "Quantum well photoconductors in infrared detector technology" (Journal of Applied Physics, Applied Physics Reviews, Apr. 15, 2003, vol. 93, No. 8, pp. 4355-4391, American Institute of Physics).

* cited by examiner

INFRARED WAVELENGTH IMAGING APPLICATIONS BASED ON QUANTUM WELL DEVICES

CROSS-REFERENCE TO RELATED APPLICATIONS

This application claims the benefit of U.S. provisional patent application No. 60/630,004 filed Nov. 22, 2004, the disclosure of which is incorporated herein by reference in its entirety.

TECHNICAL FIELD OF THE INVENTION

The present invention relates to imaging and, more particularly, to a device for imaging far or middle infrared wavelengths of light with near infrared wavelengths using an optical readout quantum well infrared photodetector (OR-QWIP).

BACKGROUND ART

There are many applications in science, medicine, defense, and industry where imaging far-infrared (FIR) to mid-infrared (MIR) wavelengths of light is desirable. These applications include medical imaging, firefighting, homeland security, monitoring volcano activities, infrared astronomy, national and tactical missile defense, and monitoring heat emission in certain geological areas. In medicine, high thermal resolution is an essential requirement for medical imaging. For example, cancer cells have higher metabolic activity than surrounding tissue, so an imaging system that can detect minute changes in temperature of cancer cells relative to surrounding tissue is highly desirable. In astronomy, visible light from distant objects can be absorbed by dust or other elements and compounds such as ozone in the Earth's atmosphere, but FIR and near-infrared (NIR) light from these same sources would penetrate the atmosphere (about a 9.5-10.5 µm window). In missile defense systems, warm targets with low background irradiance can be resolved at FIR and MIR wavelengths.

Existing techniques for detecting FIR and MIR wavelengths have many drawbacks. The technology of FIR and MIR detecting cameras is about 20 years behind standard common visible and near NIR cameras, particularly digital cameras. NIR cameras have resolutions beyond the single megapixel range (e.g., 1024×1024 pixels), while comparable and more expensive FIR and MIR cameras have resolutions only around 240×240 pixels. Another type of detector is a thermal detector, which operates on the principle that when the thermal detector is heated by incoming infrared radiation, the temperature of the thermal detector increases and the temperature changes are measured by any temperature-dependent mechanism such as thermoelectric voltage, resistance, and pyroelectric voltage. Unfortunately, detection systems dependent directly on temperature changes have slow response times.

A quantum electronic technique for MIR and FIR detection employs a Quantum Well Infrared Photodetector (QWIP), which relies on measuring currents arising from electrons in the conduction level of a quantum well becoming free of their confined quantum states. This technique suffers from the need to cool the QWIP to cryogenic temperatures so that thermal currents do not swamp out the optically-generated currents. In addition, because an electrical current is being measured, the manufacturing process requires the step of adding electrical wiring to the semiconductor wafer.

DISCLOSURE OF THE INVENTION

The present invention overcomes the disadvantages and shortcomings of the prior art discussed above by providing an infrared wavelength converter which includes a near-infrared light source for generating a near-infrared probe wave; imaging optics in optical communication with the near-infrared light source, the image optics operable to capture an image of an object and combining the near-infrared probe wave with the image of the object; a quantum well device in optical communication with the imaging optics, the quantum well device converting non-near-infrared wavelengths of the image to near-infrared wavelengths to produce a converted image; and a near-infrared detector in optical communication with the quantum well device, the near-infrared detector detecting the converted image.

The present invention also provides a method for detecting infrared images, which includes the steps of illumination an object; capturing an image of an object; generating a near-infrared probe wave using a near-infrared light source; combining the near-infrared probe wave with the image of the object using imaging optics in optical communication with the near-infrared light source; converting non-near-infrared wavelengths of the image to near-infrared wavelengths to produce a converted image using a quantum well device; and detecting the converted image using a near-infrared detector in optical communication with the quantum well device.

The type of quantum well device employed is an Optical Readout Quantum Well Infrared Photodetector (OR-QWIP). An MIR or FIR light source, such as an MIR Laser, LED, sunlight reflected from objects to be imaged, or light collected from distant objects through the lenses or mirrors of an infrared telescope, is focused by lenses or mirrors into a beam combiner, which combines the MIR or FIR radiation with NIR radiation. The combined beam impinges on an OR-QWIP device at an angle other than 90°. The lower conduction level electrons of the OR-QWIP absorb MIR/FIR photons and are excited to an upper conduction level corresponding to the MIR/FIR wavelength. The remaining free positions available in the lower conduction level become occupied by valence level electrons that absorb NIR photons corresponding to the NIR wavelength. The resulting change in transmittance through the OR-QWIP wafer of NIR radiation due to absorption is recorded by conventional near infrared detection equipment such as a standard NIR digital camera.

Alternatively, the conduction band may contain a single level where, upon excitation by an FIR/MIR source, the electrons in the single conduction level escape to free energy states. Meanwhile, NIR electrons originating from valence level by the modulated NIR source, jump to the conduction level previously occupied by the un-excited conduction band FIR/MIR electrons, thereby absorbing the NIR radiation. Like the two-conduction level OR-QWIP, the change in transmittance of NIR radiation due to absorption of photons by electrons moving from the valence level into the conduction level of the OR-QWIP is recorded by conventional near-infrared detection equipment such as a standard digital NIR camera.

The present invention can be implemented using multiple quantum well OR-QWIPs. If multiple layers of AlGaAs are alternated with multiple layers of GaAs of the same thickness and composition, then identical quantum wells will result, each of which absorbs a single MIR/FIR wavelength and a single NIR wavelength. Employing such a device improves overall efficiency of absorption of NIR light as compared to single quantum well OR-QWIPs. If multiple layers of AlGaAs are alternated with multiple layers of GaAs of different thicknesses and/or composition, then quantum wells having different energy level differences will result, the multiple quantum wells absorbing, in combination, multiple MIR/FIR wavelengths and multiple NIR wavelengths.

Since no thermal or electrical properties of the OR-QWIP device are relied upon, the system, being purely optical, does not require cryogenic temperatures or the manufacturing step of applying electrical leads to the wafer as would be needed for a system using a standard QWIP detector. Since an FIR/MIR image is converted to an NIR image, a high resolution, expensive FIR/MIR camera is not needed.

Further features and advantages of the invention will appear more clearly on a reading of the detailed description of several exemplary embodiments of the invention, which are given below by way of example only with reference to the accompanying drawings.

BRIEF DESCRIPTION OF THE DRAWINGS

For a more complete understanding of the present invention, reference is made to the following detailed description of several exemplary embodiments considered in conjunction with the accompanying drawings, in which.

BEST MODE FOR CARRYING OUT THE INVENTION

Figure 1:
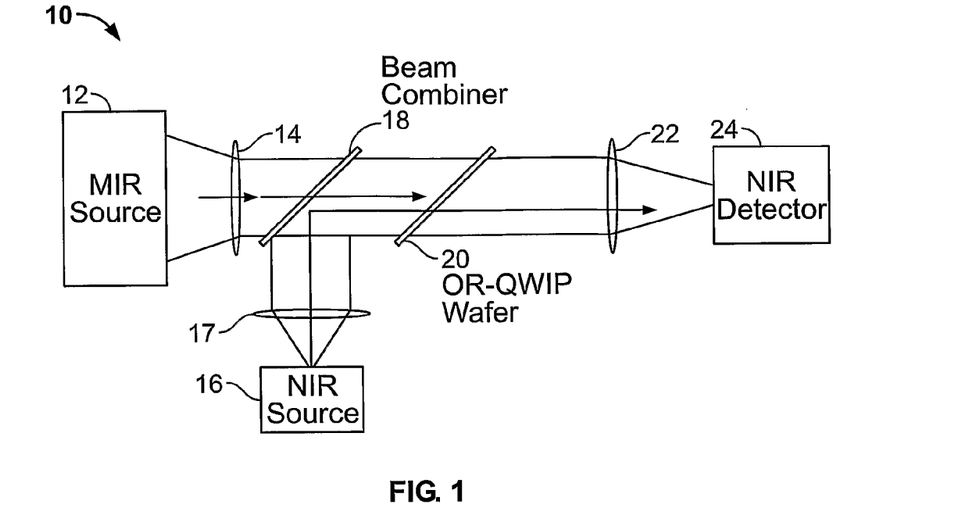
FIG. 1 is a block diagram of an exemplary embodiment of the present invention.

With reference to FIG. 1, a block diagram of an exemplary embodiment of the infrared wavelength converter of present invention, indicated generally at 10, is depicted. The following discussion is with reference to a source of MIR light, but the same apparatus would be used for a source of FIR radiation. Further, by the term "non-near-infrared," it is meant wavelengths that are not in the near-infrared spectrum, e.g., middle and far-infrared wavelengths. The infrared wavelength converter 10 includes MIR optics 14, an NIR source 16, NIR optics 17, a beam combiner 18, an OR-QWIP device 20, NIR optics 22, and an NIR detector array 24. The light from an MIR source 12 is focused into a beam by MIR optics 14. Meanwhile, an NIR source is directed by NIR optics 17 into a beam combiner 18 along with the light from the MIR source 12. The combined light impinges upon a wafer containing an OR-QWIP device 20 at a non 90° angle (here for presentation purposes shown as 45°). Some of the NIR light is absorbed by exciting electrons in the OR-QWIP device. The remaining NIR light is transmitted and focused by NIR optics 22 into an NIR detector array 24, producing an image corresponding to the MIR source.

The reason for the 45° angle, instead of, say, a direct 90° angle, is that if the angle were 90°, none of the MIR/NIR light would be absorbed in the device. The electromagnetic field of the incident radiation is polarized such that the direction of the electric fields of the MIR/NIR light must be parallel to the boundaries of the surfaces of the interfaces between layers of the semiconductors of the OR-QWIP. A 0° angle is impractical, since little of the MIR/NIR radiation would impinge upon the narrow end of the wafer. An approximate 45° angle represents a good compromise. In other embodiments, the OR-QWIP device 20 can be modified to allow for MIR/NIR absorption (and conversion) at a 90° angle of incidence. The top surface of the OR-QWIP wafer can be modified by forming a grating on the surface or structuring the surface, which leads to a non-90-degree entry angle of the MIR/NIR light with respect to the modified front surface of the OR-QWIP wafer.

Figure 2:
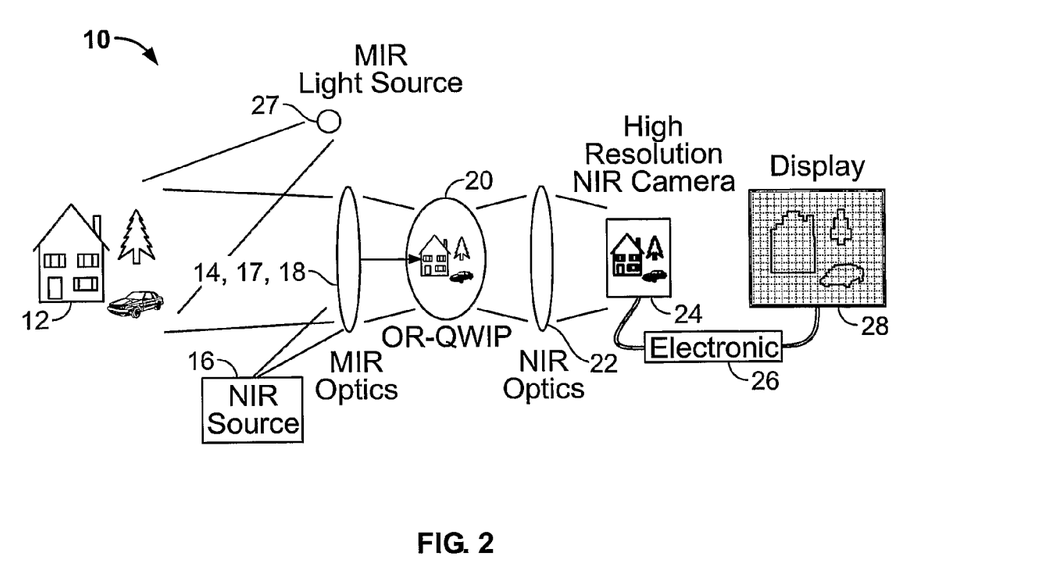
FIG. 2 is another block diagram of a conventional realization of the block diagram of FIG. 1.

With reference to FIG. 2, a block diagram of a conventional realization of the exemplary embodiment of the present invention of FIG. 1 is depicted. The MIR light source 27 could be, for example, the Sun shining MIR light onto the objects 12, which light is thereby scattered and captured by the infrared wavelength converter 10. Alternatively, the MIR light can be collected and focused directly from the objects 12 by the optics of a telescope or like device. The MIR light can also be emitted by the objects 12 themselves (thermo-emissions). MIR/NIR optics, comprising the lenses 14, 17, and beam combiner 18, focus and combine the MIR light from the objects 12 and the NIR light from the NIR light source 16. The NIR light source 16 can be, for example, a light emitting diode (LED) or laser. Light from both sources impinges on the OR-QWIP device 20, which transmits all the NIR light when the MIR optics project a large amount of MIR light into the OR-QWIP 20 (i.e., a bright spot), and transmits less NIR light when the MIR optics project a small amount of MIR light into the OR-QWIP 20 (i.e., a dark spot). The NIR light is focused by the NIR optics 22 into the aperture of any conventional high resolution NIR camera (e.g., an NIR detector array) 24, which can be either an ordinary analog camera or a digital camera. Electronics 26, which can include conventional digital image processing equipment, can enhance or modify the resulting NIR image. The resulting visible-light enhanced image can be shown on a computer display 28 or printed on paper as a conventional photograph.

Figure 3:
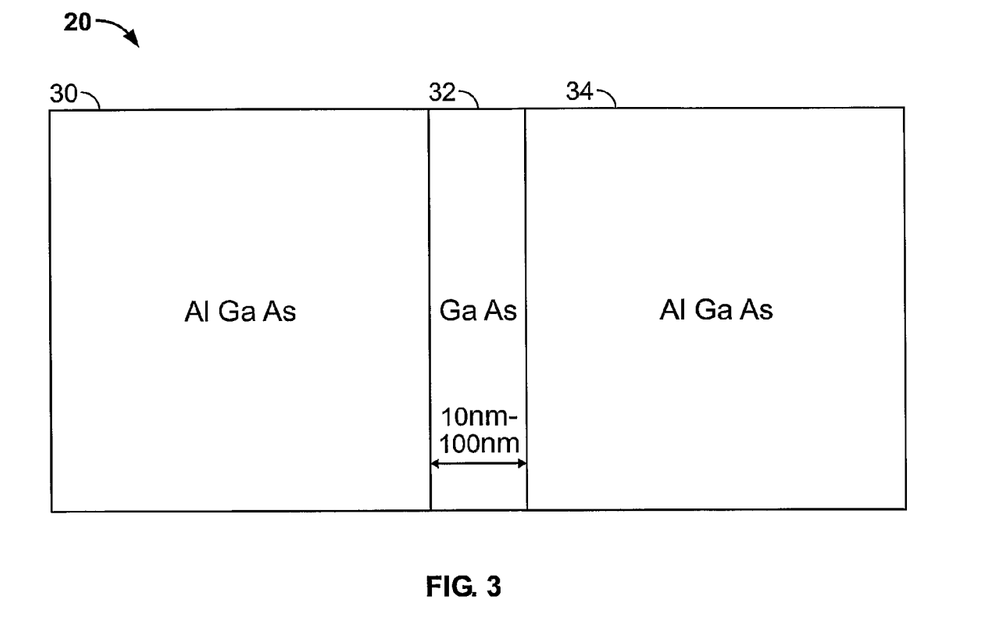
FIG. 3 is a block diagram of the layers of material used to create a quantum well device employed in the exemplary embodiment of FIG. 1.
Figure 4:
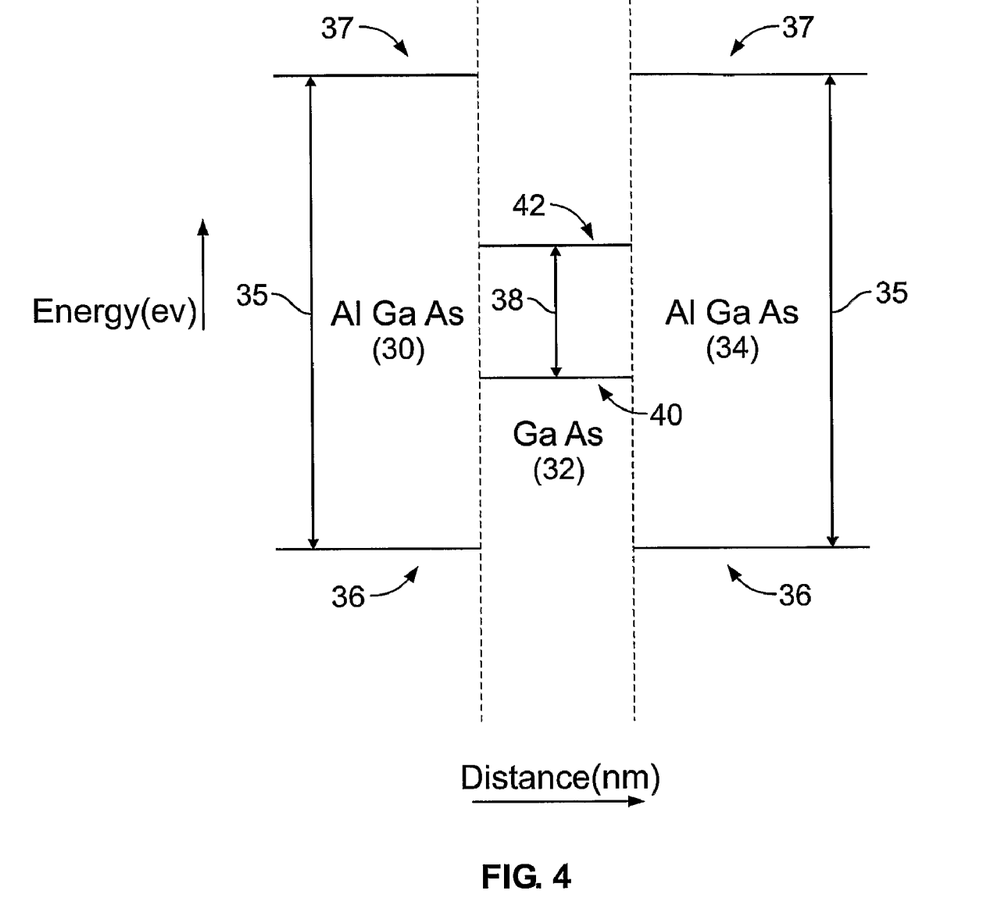
FIG. 4 is an energy level diagram representing the relative size of energy bands, or band gaps, between the layers of semi-conductors of FIG. 3.

Referring now to FIGS. 3 and 4, the OR-QWIP device 20 is a variation of the well known quantum well, in which a doped-semiconductor, such as Gallium Arsenide (GaAs), is sandwiched in a very thin layer 32 between two much thicker semiconductor layers 30 and 34 of different composition but similar lattice boundary structure to the intervening layer. The most common semiconductor material used for the outer layers 30 and 34 is aluminum gallium arsenide (AlGaAs). The thickness 36 of the GaAs layer 32 ranges from about 10 nanometers (nm) to about 100 nanometers.

The layers of AlGaAs 30, 34 and GaAs 32 could be grown on top of each other using the process called molecular beam epitaxy (MBE), as is known in the art, or using any other suitable process. The energy level diagram of FIG. 4 shows energy measured in electron Volts (eV) plotted on the vertical axis, and distance through the semiconductor layers plotted on the horizontal axis. FIG. 4 depicts the band gap 35 between the valence band energy level 36 and the conduction band energy levels 37 for electrons for the AlGaAs layers 30, 34, and the band gap 38 between the valence band energy level 40 and the conduction band energy level 42 of the GaAs layer. The band gap 38 is chosen to be smaller than the band gap 35.

The difference in band gap levels combined with the thickness of the intervening GaAs layer 32 causes electrons in the GaAs layer 32 to be confined in a well along the direction of the thickness of the GaAs layer 32. This confinement causes the energy bands of the GaAs layer 32 to be forced into a small number of quantized levels, hence the name quantum well. Typically, there is a single valence level (not shown) in the original valence band 40 of the GaAs layer 32 and one or two (not shown) conduction levels in the former conduction band 42. Because the electrons are free to move in directions of motion perpendicular to the direction of the thickness of GaAs layer 32, more than one electron can occupy the valence or conduction levels.

Figure 5:
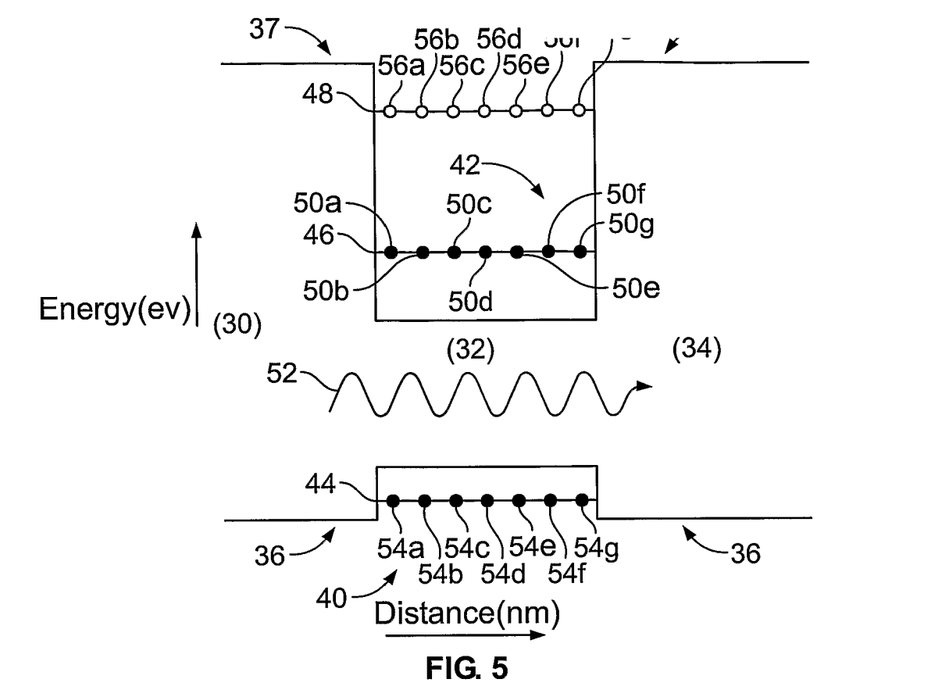
FIG. 5 is an energy level diagram of the valence and conduction levels of the quantum well of FIG. 4, showing how NIR light is completely transmitted when electrons from the valence level are not excited to an occupied lower conduction level.

Referring now to FIG. 5, an energy level diagram of the valence level 44 and conduction levels 46 and 48 of the GaAs quantum well for the case of total NIR photon transmission is depicted. The difference in energy between the lower conduction level 46 and the upper conduction level 48 corresponds to the desired MIR light wavelength to be imaged, while the difference in energy between the valence level 44 and the lower conduction level 46 corresponds to the desired "probe" or modulating NIR light wavelength. When the MIR light source 12 contains no light of the desired MIR wavelength to be imaged, electrons at lower conduction level positions 50a-50g remain in the lower conduction level 46. Photons 52 of the desired NIR wavelength from NIR source 16 are used to "probe" the GaAs layer 32 (see FIGS. 3-4). Photons 52 of a desired NIR wavelength from the NIR source 16 cannot be absorbed by electrons at valence level positions 54a-54g, so that none of these electrons can jump to the lower conduction level 46. As a result, all of the NIR photons 52 are transmitted thereby producing a bright spot at the detector 24.

Figure 6:
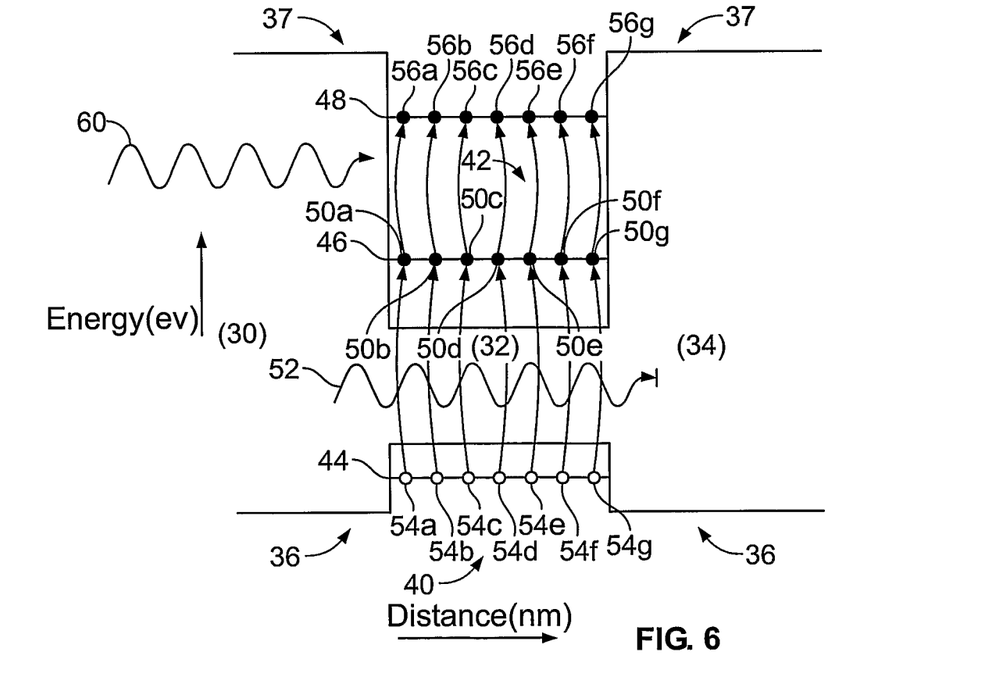
FIG. 6 is an energy level diagram of the valence and conduction levels of the quantum well of FIG. 4, showing how NIR light is completely absorbed when electrons from the lower conduction level are excited by MIR or FIR light to the upper conduction level, thereby emptying the lower conduction level so that valence level electrons can be excited to the lower conduction level by NIR light.

Referring now to FIG. 6, an energy level diagram of the valence level 44 and conduction levels 46 and 48 of the GaAs quantum well for the case of total NIR photon absorption is depicted. When the MIR light source 12 contains a large amount of light of the desired MIR wavelength to be imaged, electrons at lower conduction level positions 50a-50g absorb MIR photons 60 and jump to completely fill the positions 56a-56g of the upper conduction level 48. The electrons at valence level positions 54a-54g in the valence level 44 absorb all the photons 52 and jump to the lower conduction level 46 to fill positions 50a-50g. As a result, none of the NIR photons 52 are transmitted, thereby producing a dark spot at the detector 24.

Figure 7:
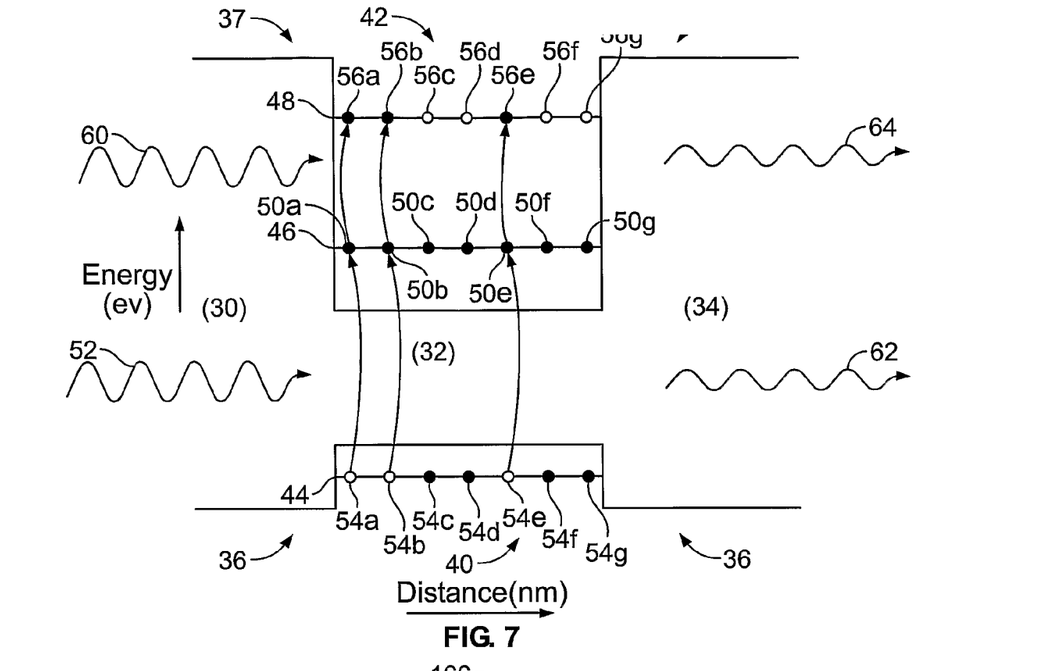
FIG. 7 is an energy level diagram of the valence and conduction levels of the quantum well of FIG. 4, showing the more common case where some electrons are excited by MIR/FIR light to the upper conduction level and other electrons are excited by NIR light to the lower conduction level, thereby absorbing some but not all of the NIR light.

With reference to FIG. 7, an energy level diagram of the more common case is depicted where electrons are excited by, and absorbed by, both MIR and NIR light. Some of the MIR photons 60 are absorbed by the electrons at lower conduction level positions 50a-50g in the lower conduction level 46 and these electrons jump to the upper conduction level 48 to occupy some of the positions 56a-56g, and a complementary number of electrons at valence level positions 54a-54g absorb the NIR photons 52 and jump from the valence level 44 to some of the positions 50a-50g in the lower conduction level 46. As a result, some of the NIR photons 62 are transmitted, and some of the MIR photons 64 are transmitted.

Over a range of intensities of the original incoming MIR photons 60 that produce from 0% to 100% absorption, a corresponding (e.g., 20%-0%) of the NIR photons 52 are absorbed and thus a corresponding amount of NIR photons 62 are transmitted (The portion of the MIR photons 64 which are transmitted are not detected by the NIR camera 24). The change of only 20% in intensity of NIR photons 52 for a 100% change in intensity (a dark spot) of the original MIR photons 60 is compensated for by the sensitivity of a readily available, high resolution NIR camera 24, and small variations can be further enhanced by the electronics 26.

As already should be apparent from the discussions of FIGS. 3-7, only one particular wavelength of MIR light is sensed and one particular wavelength of NIR light is transmitted. The choice of wavelengths depends on the difference in energy between the valence level 44 and the lower conduction level 46 for the NIR light. These level differences and hence the wavelengths absorbed can be tuned to a range of values that depend primarily of the thickness of the GaAs layer 32 and the relative proportions of the elements comprising the AlGaAs layer 30, 34 and the GaAs layer 32. Other semiconductor materials besides AlGaAs and GaAs can also be used, which can lead to the conversion of MIR images to images in different NIR wavelength region or even to images in the visible light spectrum. To date, wavelengths from FIR (300 μm) to MIR (3 μm) have been successfully imaged with high resolution.

Figure 8:
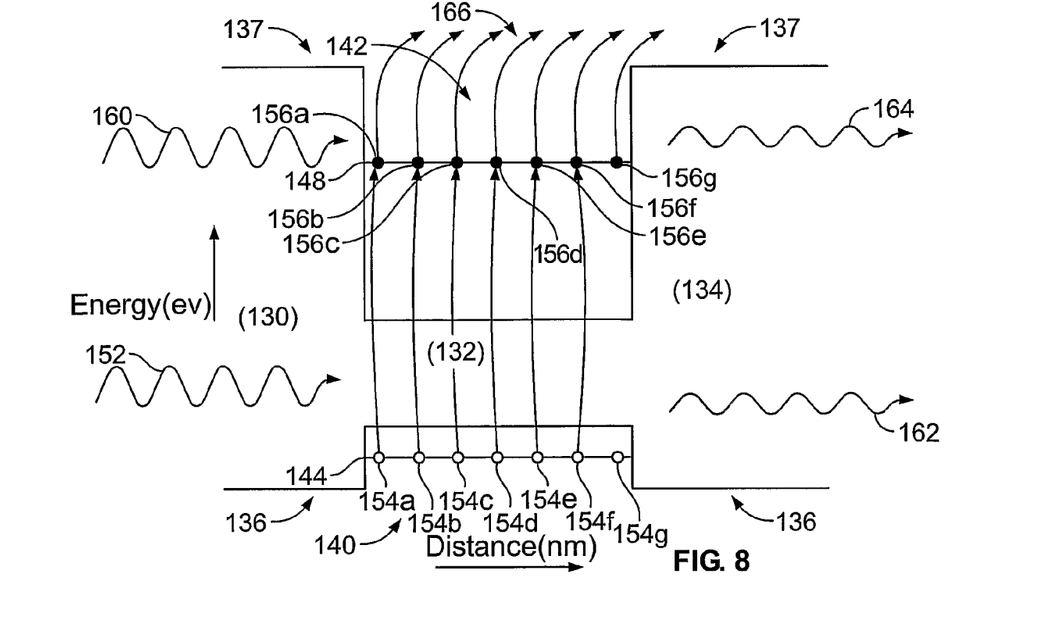
FIG. 8 is an energy level diagram of a single conduction level embodiment of the OR-QWIP quantum well in which electrons in the single conduction level, excited by MIR/FIR light, escape to free energy states and valence level electrons replace the free conduction level electrons by absorbing NIR light.

FIG. 8 depicts an alternate embodiment of the OR-QWIP 20 shown in FIGS. 3-7. Elements illustrated in FIG. 8 which correspond to the elements described above in connection with the embodiment of FIGS. 3-7 have been identified by corresponding reference numbers increased by one hundred. Unless otherwise indicated, both embodiments have the same construction and operation.

Referring now to FIG. 8, a block diagram of a single conduction level embodiment of the OR-QWIP quantum well device is depicted. In this embodiment, the aforementioned materials and thickness of the GaAs layer 132 are varied such that only a single conduction level 148 is present in the quantum well. When excited by MIR and/or FIR light photons 160, the electrons at conduction level positions 156a-156g break free of the quantum well, entering free electron levels 166 and thus can wander throughout the GaAs layer 132 in any direction of motion. The electrons at valence level positions 154a-154g, excited by the NIR light photons 152 can jump to the positions 156a-156g that the conduction level electrons formerly occupied. Thus, an attenuated beam of NIR photons 162 and MIR photons 164 are transmitted in a fashion similar to that depicted in FIGS. 6 and 7.

Figure 9:
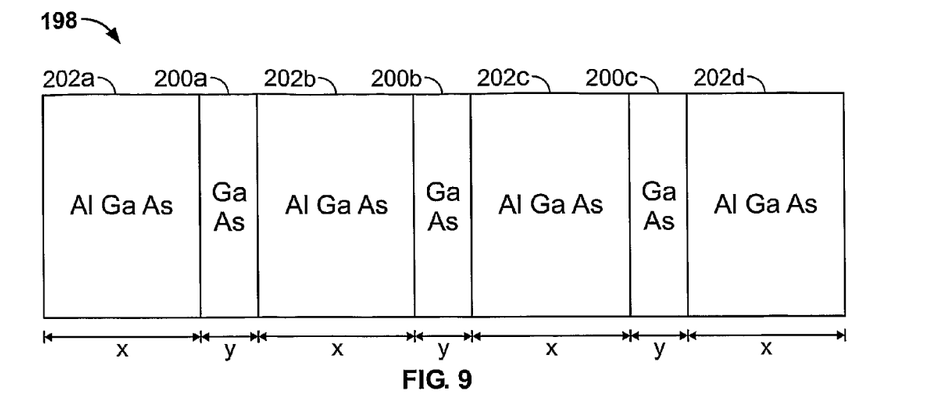
FIG. 9 is a cross-sectional view of another embodiment of the present invention, wherein multiple layers of material are used to create a multiple quantum well OR-QWIP, which increases NIR absorption efficiency of a single wavelength.

The present invention is susceptible to numerous modifications and variations. For instance, the single MIR/NIR frequency OR-QWIP of the present invention could be modified to include multiple layers of AlGaAs and GaAs, so as to provide a device that has increased absorption efficiency for a single, or multiple, wavelengths. As shown in FIG. 9, multiple layers of material, indicated at 198, are used to create multiple identical quantum wells so as to increases NIR absorption efficiency of a single wavelength. Instead of a single, thin layer of GaAs being positioned between two layers of AlGaAs (such as depicted for the OR-QWIP 20), several identical thin layers 200a-200c of GaAs (of thickness "y") can be alternated between identical layers 202a-202d of AlGaAs (of thickness "x") to produce a multiple quantum-well OR-QWIP.

Figure 10:
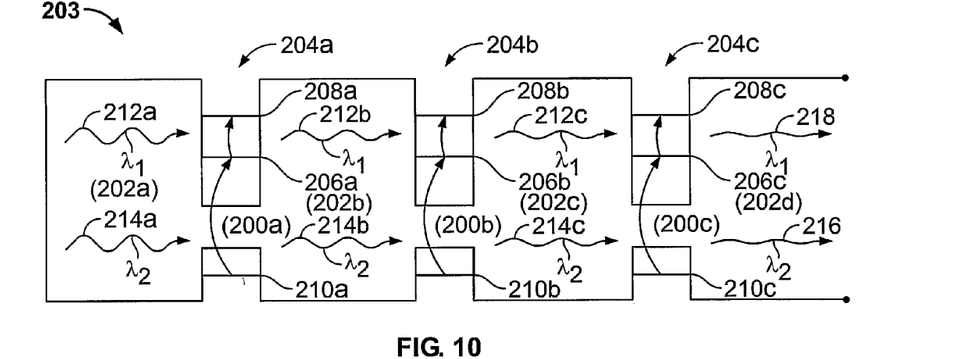
FIG. 10 is an energy level diagram of the valence and multiple conduction levels of the multiple quantum well device of FIG. 9, showing some electrons being excited by MIR/FIR light to the upper conduction level and other electrons being excited by NIR light to the lower conduction level, thereby absorbing most of the NIR light of a single wavelength.
Figure 11:
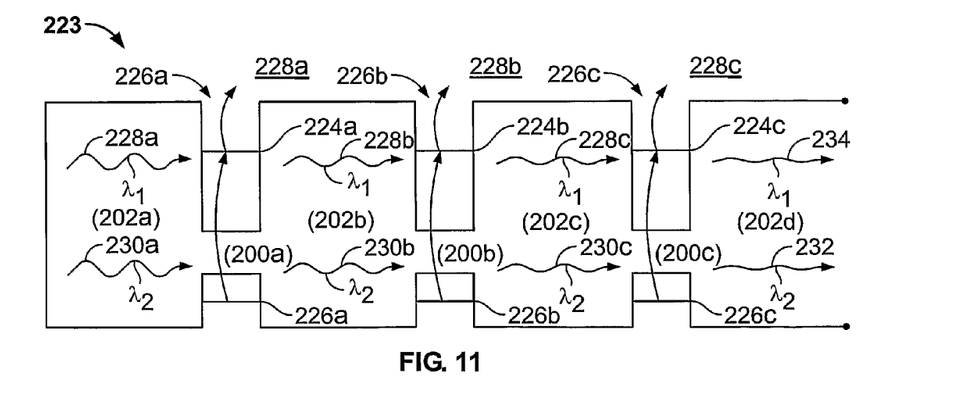
FIG. 11 is an energy level diagram of a single conduction level embodiment of the multiple quantum well device of FIG. 9, in which electrons in a single conduction level, excited by MIR/FIR light, escape to free energy states and valence level electrons replace the free conduction level electrons by absorbing NIR light, thereby absorbing most of the NIR light of a single wavelength.

Referring now to FIGS. 10 and 11, if the GaAs layers 200a-200c have the same thickness and composition, then multiple quantum wells 204a-204c are created, which have identical conduction and valance band energy levels. FIG. 10 shows a multiple quantum-well, single MIR/NIR frequency OR-QWIP 203 with two conduction levels 206a-206c, 208a-208c and a single valance level 210a-210c. Some of the MIR photons 212a-212c of wavelength $\lambda_1$ are absorbed by the electrons in the lower conduction levels 206a-206c and these electrons jump to the second conduction levels 208a-208c. A complementary number of electrons absorb the NIR photons 214a-214c of wavelength $\lambda_2$, and jump from the valence levels 210a-210c to the lower conduction levels 206a-206c. Since the relative positions in energy of the valance levels 210a-210c and the conduction levels 206a-206c, 208a-208c are the same for all quantum wells 204a-204c, photons of identical wavelengths of MIR and NIR light are absorbed. As a result, some of the NIR photons 216 are transmitted, and some of the MIR photons 218 are transmitted. However, since the photons 212a-212c, 214a-214c pass through successive identical GaAs layers 200a-200c, each time absorbing a quantity of the photons 212a-212c, 214a-214c, then over a range of intensities of the original incoming MIR photons 212a-212c that produce from 0% to 100% absorption, a corresponding (e.g., nearly 100%-0%) of the NIR photons 214a-214c are absorbed by the OR-QWIP 203, thereby improving NIR photon efficiency of the OR-QWIP 203, obviating the need for further enhancement by electronics.

Referring now to FIG. 11, there is shown a multiple quantum-well, single MIR/NIR frequency OR-QWIP 223 having a single conduction level 224a-224c and a single valance level 226a-226c. When excited by MIR and/or FIR light photons 228a-228c of wavelength $\lambda_1$, the electrons in the conduction levels 224a-224c break free of the quantum wells 226a-226c, entering free electron levels 228a-228c and thus can travel throughout the GaAs layers 200a-200c of the OR-QUIP 223 in any direction of motion. The electrons in the valence levels 226a-226c, excited by the NIR light photons 230a-230c of wavelength $\lambda_2$, can jump to the positions in the conduction levels 224a-224c that the conduction level electrons formerly occupied. As a result, some of the NIR photons 232 are transmitted, and some of the MIR photons 234 are transmitted. However, when the photons 228a-228c, 230a-230c pass through successive identical GaAs layers 200a-200c, each time absorbing a quantity of the photons 228a-228c, 230a-230c, then, like the OR-QWIP 203 of FIG. 10, over a range of intensities of the original incoming MIR photons 228a-228c that produce from 0% to 100% absorption, a corresponding (e.g., nearly 100%-0%) of the NIR photons 230a-230c are absorbed by the OR-QUIP 223.

Figure 12:
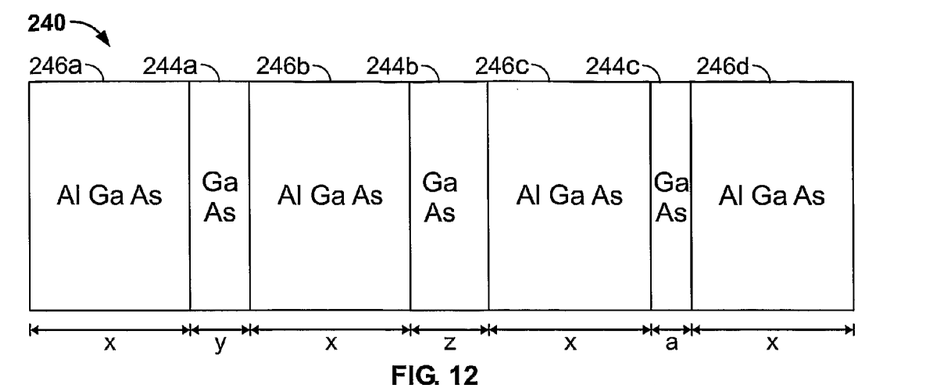
FIG. 12 is a cross-sectional view of a multiple quantum well embodiment of the present invention, wherein the thicknesses of the layers vary to provide sensitivity to multiple wavelengths.
Figure 13:
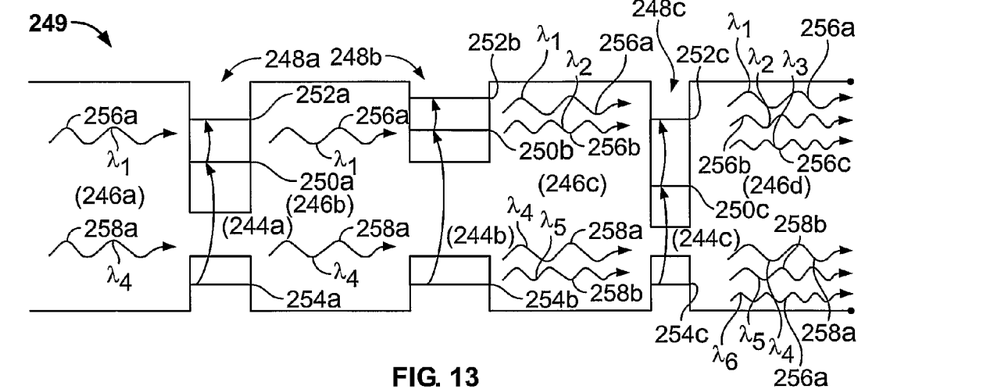
FIG. 13 is an energy level diagram of the valence and multiple conduction levels of the multiple quantum well device of FIG. 12, showing some electrons being excited by MIR/FIR light to upper conduction levels and other electrons being excited by NIR light to several lower conduction levels in different quantum wells, thereby absorbing NIR light of different wavelengths.
Figure 14:
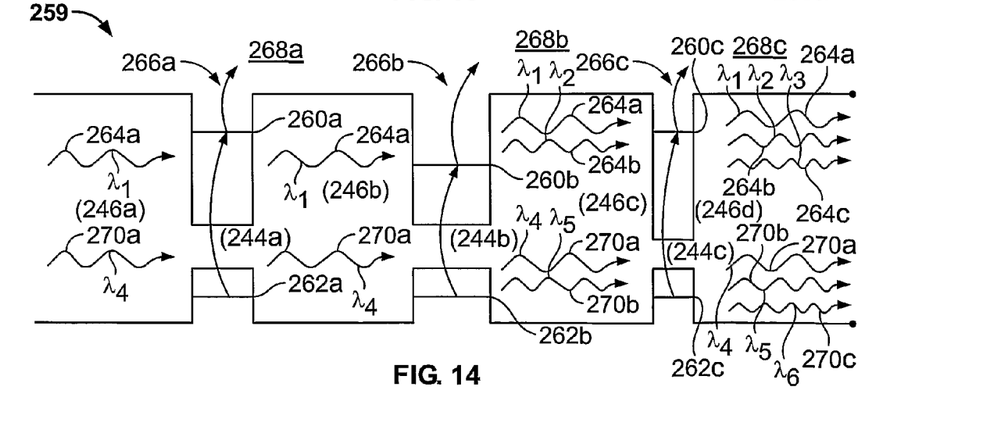
FIG. 14 is an energy level diagram of a single conduction level embodiment of the multiple quantum well device of FIG. 12, in which electrons in multiple conduction levels, excited by MIR/FIR light, escape to free energy states and valence level electrons replace the free conduction level electrons, thereby absorbing NIR light of different wavelengths.

Referring now to FIG. 12, there is shown a cross-sectional view of the layers of material 240 used to create a multiple quantum-well, multiple MIR/NIR frequency, wherein thicknesses of the layers 240 vary so as to provide sensitivity to multiple wavelengths. Like the OR-QWIP 203 of FIG. 9, the device 240 of FIG. 12 has several thin layers 244a-244c of GaAs (of thicknesses "y", "z" and "a") alternated between identical layers 246a-246d of AlGaAs (of thickness "x"). Referring now to FIGS. 13 and 14, if the GaAs layers 244a-244c have different thicknesses and/or composition, then multiple quantum wells 248a-248c are created having different conduction and valance band energy levels. FIG. 13 shows a multiple quantum-well, multiple MIR/NIR frequency OR-QWIP 249 with two conduction level 250a-250c, 252a-252c and single valance level 254a-254c. The difference in energy between the conduction levels 250a, 252a differ from the difference in energy between the conduction levels 250b, 252b and further differ from the difference in energy between the conduction levels 250c, 252c. Likewise, the difference in energy between the valance level 254a and the conduction level 250a, differ from the difference in energy between the valance level 254b and the conduction level 250b, and further differ from the difference in energy between the valance level 254c and the conduction level 250c. The energy differences among corresponding levels between the quantum wells 248a-248c of the OR-QWIP 249 means that different wavelengths of photons can be absorbed for MIR ($\lambda_1, \lambda_2, \lambda_3$) and/or NIR light ($\lambda_4, \lambda_5, \lambda_6$).

Referring now to FIG. 13, some of the MIR photons 256a of a first wavelength $\lambda_1$, are absorbed by the electrons in the lower conduction level 250a of the quantum well 248a, and these electrons jump to the second conduction level 252a, and a complementary number of electrons absorb the NIR photons 258a of a fourth wavelength $\lambda_4$ and jump from the valence level 254a to the lower conduction levels 250a. Some of the MIR photons 256b of a second wavelength $\lambda_2$ are absorbed by the electrons in the lower conduction level 250b of the quantum well 248b, and these electrons jump to the second conduction level 252b, and a complementary number of electrons absorb the NIR photons 258b of a fifth wavelength $\lambda_5$ and jump from the valence level 254b to the lower conduction levels 250b. Some of the MIR photons 256c of a third wavelength $\lambda_3$ are absorbed by the electrons in the lower conduction level 250c of the quantum well 248c, and these electrons jump to the second conduction level 252c, and a complementary number of electrons 258c absorb the NIR photons of a sixth wavelength $\lambda_5$ and jump from the valence level 254c to the lower conduction levels 250c. As a result, some of the NIR photons 258a-258c are transmitted, and some of the MIR photons 256a-256c are transmitted.

Referring now to FIG. 14, there is shown a multiple quantum-well, multiple MIR/NIR frequency OR-QWIP 259 having single conduction levels 260a-260c and single valance levels 262a-262c. When excited by MIR and/or FIR light photons 264a-264c of three different wavelengths ($\lambda_1$, $\lambda_2$, $\lambda_3$), the electrons in the conduction levels 260a-260c break free of the quantum wells 266a-266c, entering free electron levels 268a-268c and thus can wander throughout the GaAs layers 200a-200c in any direction of motion. The electrons in the valence levels 262a-262c, excited by the NIR light photons 270a-270c of three different wavelengths ($\lambda_4$, $\lambda_5$, $\lambda_6$), can jump to the positions in the conduction levels 260a-260c that the conduction level electrons formerly occupied. As a result, some of the NIR photons 270a-270c are transmitted, and some of the MIR photons 264a-264c are transmitted.

In the embodiments depicted in FIGS. 12-14, three different NIR wavelengths 270a-270c ($\lambda_4$, $\lambda_5$, $\lambda_6$) can be processed by electronics to produce false color images corresponding to red-green-blue in the visible spectrum, and hence any single color can be produced. This layering of GaAs—AlGaAs regions can be extended to produce any number of quantum wells of different widths and/or composition, and hence, in principle, can produce non-identical multiple quantum well devices which respond to any number of wavelengths of MIR light and/or NIR light.

Figure 15:
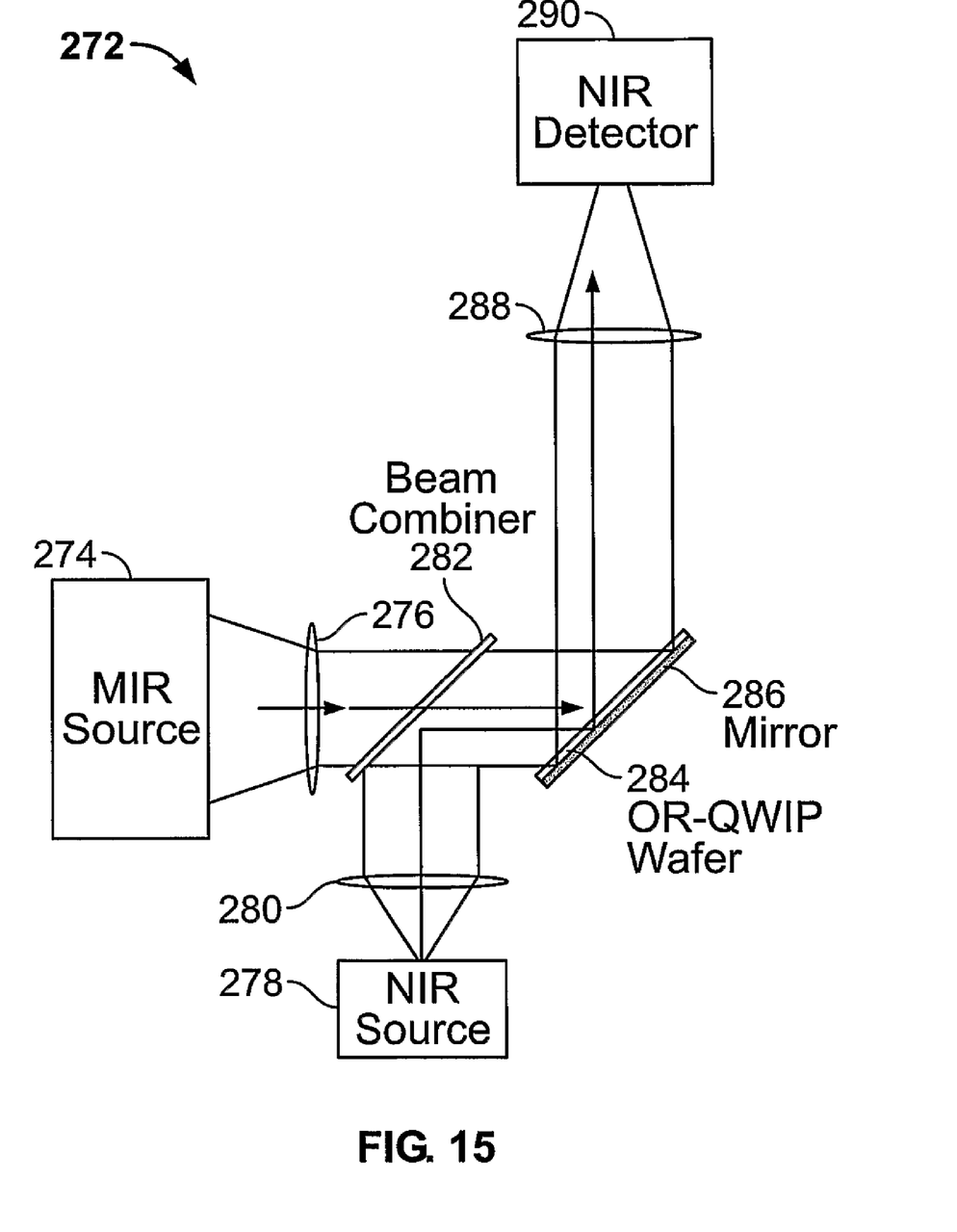
FIG. 15 is a block diagram of another exemplary embodiment of the present invention, showing the use of a mirror for reflecting NIR light back through the OR-QWIP wafer and into a NIR detector.

With reference to FIG. 15, a block diagram of another exemplary embodiment of the infrared wavelength converter of present invention, indicated generally at 272, is depicted. The infrared wavelength converter 272 includes MIR optics 276, a NIR source 278, NIR optics 280, a beam combiner 282, an OR-QWIP device 284, a mirror 286, NIR optics 288, and a NIR detector array 290. Like the embodiment depicted in FIG. 1, the light from a MIR source 274 is focused into a beam by MIR optics 276. Meanwhile, the NIR source 278 is directed by NIR optics 280 into a beam combiner 282 along with the light from the MIR source 274. The combined light impinges upon a wafer containing an OR-QWIP device 284 at a non 90° angle. Some of the MIR light and part of the NIR light is absorbed by exciting electrons in the OR-QWIP device 284. The remaining NIR light travels through the OR-QWIP device 284, and is reflected back into the OR-QWIP device 284 by the mirror 286. The mirror 286 could be in contact with the OR-QWIP device 284 or adjacent to it. For example, the mirror 286 could be bonded to (or deposited on) a surface of the OR-QWIP device 284. Reflecting the NIR light back into the OR-QWIP device 284 increases the interaction length of the NIR and MIR light, thereby increasing the MIR-to-NIR conversion efficiency of the device. The now twice-transmitted NIR light leaves the OR-QWIP device 284, and is then focused by NIR optics 288 into the NIR detector array 290, producing an image corresponding to the MIR source.

Referring again to FIG. 2, in yet another embodiment of the present invention, the MIR source 27 can be included as part of the infrared wavelength converter 10. In such circumstances, the MIR source 27 can include a MIR laser, LEDs, glowbars, and/or other MIR sources, which can be operated continuously or by means of pulses of MIR light. If operated in pulsed mode, the pulse rate, duration, and emission time of the MIR light can be electronically controlled and synchronized with the NIR light from a pulsed NIR source (i.e., NIR source 16, if pulsed) whose pulse rate and duration and can also be controlled. In a synchronized pulse mode, the NIR light pulses are emitted with a time delay with respect to the MIR light pulses, which corresponds to the light propagation time from the MIR source 27 to the objects 12 and then to the OR-QWIP 20. This would suppress the conversion of MIR light impinging at other times on the OR-QWIP 20, increasing the sensitivity of the NIR detector 24 and suppressing the influence of MIR emissions from undesired sources (e.g., a fire burning within the field of view).

In the case of pulsed light sources, the time delay between pulses emitted by the NIR source 16 and the MIR source 27 can be adjusted and used to determine the distance between the objects 12 and the OR-QWIP 20. In this situation, an MIR pulse will be converted and then visible for the NIR camera 24 only for a predetermine time-delay. The amount of delay needed for an MIR pulse to be converted and detected serves as a measure of the distance between the objects 12 and the OR-QWIP device 20.

An advantage of an all-optical design employing an OR-QWIP device over a design using a QWIP device is that no electrical currents must be measured. Another advantage over QWIP devices is that cryogenic cooling is not needed to eliminate thermal noise currents. These advantages reduce manufacturing and operational complexity and hence cost. An advantage of the present invention over thermal detection devices is that an optical method has a faster response time (picoseconds) than that of thermal detectors (milliseconds). Still another advantage of using an OR-QWIP device is that inexpensive, high resolution optical imaging devices such as NIR digital cameras can be employed rather than the more expensive, low resolution MIR/FIR cameras.

It will be understood that the embodiments described herein are merely exemplary and that a person skilled in the art may make many variations and modifications without departing from the spirit and scope of the invention. All such variations and modifications are intended to be included within the scope of the present invention as defined in the appended claims.

The invention claimed is:

1. An apparatus for detecting images in a first selected bandwidth, comprising:
   a probe light source configured to generate a probe beam in a second selected bandwidth;
   an optical path including input imaging optics operable to capture an image of an object in said first selected bandwidth and form an image beam and a beam combiner to optically combine said probe beam with said image beam to form a combined beam;
   an optical readout quantum well device in the optical path of said combined beam, said optical readout quantum well device simultaneously passing in an optical readout beam an intensity level of at least one wavelength within said probe beam in said second selected bandwidth in proportion to an intensity level of at least one wavelength within said image beam in said first selected bandwidth; and
   a detector in the optical path of said optical readout beam sensitive to light in said second selected bandwidth and not sensitive to light in said first selected bandwidth.

2. The apparatus of claim 1, wherein said optical readout quantum well infrared device is positioned at a non 90° angle of incidence of said combined beam.

3. The apparatus of claim 2, wherein said imaging optics further include at least one lens for focusing the image into the image beam incident onto said beam combiner.

4. The apparatus of claim 3, further including at least one lens for focusing the probe beam onto the beam combiner.

5. The apparatus of claim 4, further including output imaging optics configured to focus said optical readout beam on said detector.

6. The apparatus of claim 2, wherein said detector further includes a camera sensitive to light in said second selected bandwidth.

7. The apparatus of claim 6, further including a light source in said first selected bandwidth illuminating said object.

8. The apparatus of claim 7, wherein said light source further includes one of a non-near-infrared laser, a non-near-infrared LED, and a non-near-infrared glowbar.

9. The apparatus of claim 8, wherein said non-near-infrared light source emits continuous non-near-infrared light.

10. The apparatus of claim 8, wherein said non-near-infrared light source emits pulses of non-near-infrared light, and wherein said probe light source emits pulses of near-infrared light.

11. The apparatus of claim 10, wherein pulse rates, durations, and emission times of said probe light source and said near-infrared light source can be controlled and synchronized to suppress probe light from other sources.

12. The apparatus of claim 11, wherein pulse rates, durations, and emission times of said non-near-infrared light source and said probe light source can be controlled and synchronized to measure the distance between the object and said optical readout quantum well device.

13. The apparatus of claim 6, wherein said detector further includes digital image processing equipment for processing imaging data produced by said camera.

14. The apparatus of claim 13, wherein said detector further includes a display for displaying said converted image.

15. The apparatus of claim 1, further comprising a mirror in the optical path adjacent said optical readout quantum well device re-directing said optical readout beam through said optical readout quantum well.

16. The apparatus of claim 1, wherein said optical readout quantum well device further includes a grating.

17. The apparatus of claim 1, wherein said optical readout quantum well device further includes an inner layer of a doped semiconductor material positioned between two outer layers of a semiconductor material having a different composition than, and a similar lattice boundary structure to, the inner layer.

18. The apparatus of claim 17, wherein the inner layer is formed from GaAs and the two outer layers are formed from AlGaAs.

19. The apparatus of claim 18, wherein the level of doping and the thickness of the inner layer are chosen to cause the energy levels of electrons of the inner layer to be quantized at a selected energy level.

20. The apparatus of claim 19, wherein said inner layer is approximately 10 nanometers to 100 nanometers in thickness.

21. The apparatus of claim 19, wherein said doping and thickness of the inner layer is selected such that electrons are quantized into a single valence level, a lower conduction level, and an upper conduction level.

22. The apparatus of claim 21, wherein the materials, doping, and thickness of said inner layer and said two outer layers are chosen such that the difference in energy between the lower conduction level and the upper conduction level corresponds to a desired light wavelength within said first selected bandwidth to be imaged.

23. The apparatus of claim 21, wherein the materials, doping, and thickness of said inner layer and said two outer layers are chosen such that the difference in energy between the valance level and the lower conduction level correspond to said probe wavelength.

24. The apparatus of claim 19, wherein said doping and thickness of the inner layer is selected such that electrons are quantized into a single valence level and one conduction level.

25. The apparatus of claim 24, wherein the materials, doping, and thickness of said inner layer and said two outer layers are chosen such the difference in energy between the conduction band and the free energy state correspond to a desired light wavelength to be imaged within said first selected bandwidth.

26. The apparatus of claim 24, wherein the materials, doping, and thicknesses of said inner layer and said two outer layers are chosen such that the difference in energy between the valance level and the conduction level corresponds to a selected probe wavelength.

27. The apparatus of claim 1, wherein said optical readout quantum well infrared device further includes a first plurality of layers of a first doped semiconductor material alternating with a second plurality of layers of a second semiconductor material.

28. The method of claim 27, wherein the thicknesses, doping, and materials of the first and second pluralities of layers are adjustable so that said optical readout quantum well infrared device selectively passes multiple wavelengths.

29. The apparatus of claim 28, wherein the first doped semiconductor material comprises AlGaAs and the second doped semiconductor material comprises GaAs.

30. The apparatus of claim 29, wherein said optical readout quantum well infrared device comprises alternating layers of AlGaAs and GaAs.

31. The apparatus of claim 27, wherein the energy levels of electrons in said second plurality of layers of said second semiconductor material are quantized into a valence level, a lower conduction level, and an upper conduction level, each of said levels having a constant energy level.

32. The apparatus of claim 27, wherein the energy levels of electrons in said second plurality of layers of said second semiconductor material are quantized into a valence level, a lower conduction level, and an upper conduction level having different energy values.

33. The apparatus of claim 27, wherein energy levels of the electrons in said second plurality of layers of said second semiconductor material are quantized into a valence level and a conduction level having different energy values.

34. The apparatus of claim 1, wherein:
the first selected bandwidth includes at least one of far infrared ("FIR") and mid-infrared ("MIR") wavelengths.

35. The apparatus of claim 1, wherein:
the second selected bandwidth includes near infrared wavelengths.

36. A method for detecting images in light within a first selected bandwidth, comprising the steps of:
capturing an image of an object illuminated by light in said first selected bandwidth to form an image beam;
generating a probe beam using a light source in a second selected bandwidth;

combining the probe beam with the image of the object in the image beam;

utilizing an optical readout quantum well device to simultaneously pass in an optical readout beam an intensity level of at least one wavelength within said probe beam in said second selected bandwidth in proportion to an intensity level of at least one wavelength within said image beam in said first selected bandwidth; and detecting the optical readout beam using a detector sensitive to light in the second selected bandwidth and insensitive to light in the first selected bandwidth.

37. The method of claim 36, further including the step of combining the image and the probe beam using a beam combiner.

38. The method of claim 37, further including the step of focusing the image onto the beam combiner using at least one lens.

39. The method of claim 38, further including the step of focusing the probe beam onto the beam combiner using at least one lens.

40. The method of claim 36, wherein the step of detecting the optical readout beam further includes the step of using a camera sensitive to light in the second selected bandwidth.

41. The method of claim 40, wherein the step of detecting the optical readout beam further includes the step of processing imaging data produced by the camera using digital image processing equipment.

42. The method of claim 41, wherein the step of detecting the optical readout beam further includes the step of displaying the image using a display.

43. The method of claim 36, wherein:

the first selected bandwidth includes at least one of far infrared ("FIR") and mid-infrared ("MIR") wavelengths.

44. The method of claim 36, wherein:

the second selected bandwidth includes near infrared wavelengths.

* * * * *